April 6, 1971  B. E. CHITWOOD ET AL  3,574,040
APPARATUS FOR MAKING LAMINATED STRUCTURAL SHAPES BY THE
CONTROLLED DETRUSIVE PLACEMENT AND POLYMERIZATION
OF TECTONIC FILAMENTOUS TAPES
Filed June 29, 1967  4 Sheets-Sheet 1

BILLIE E. CHITWOOD
MARVIN S. HOWETH
*INVENTORS*

BY Charles Woodward
ATTORNEY

BILLIE E. CHITWOOD
MARVIN S. HOWETH
INVENTORS

BY *Charles M Woodward*
ATTORNEY

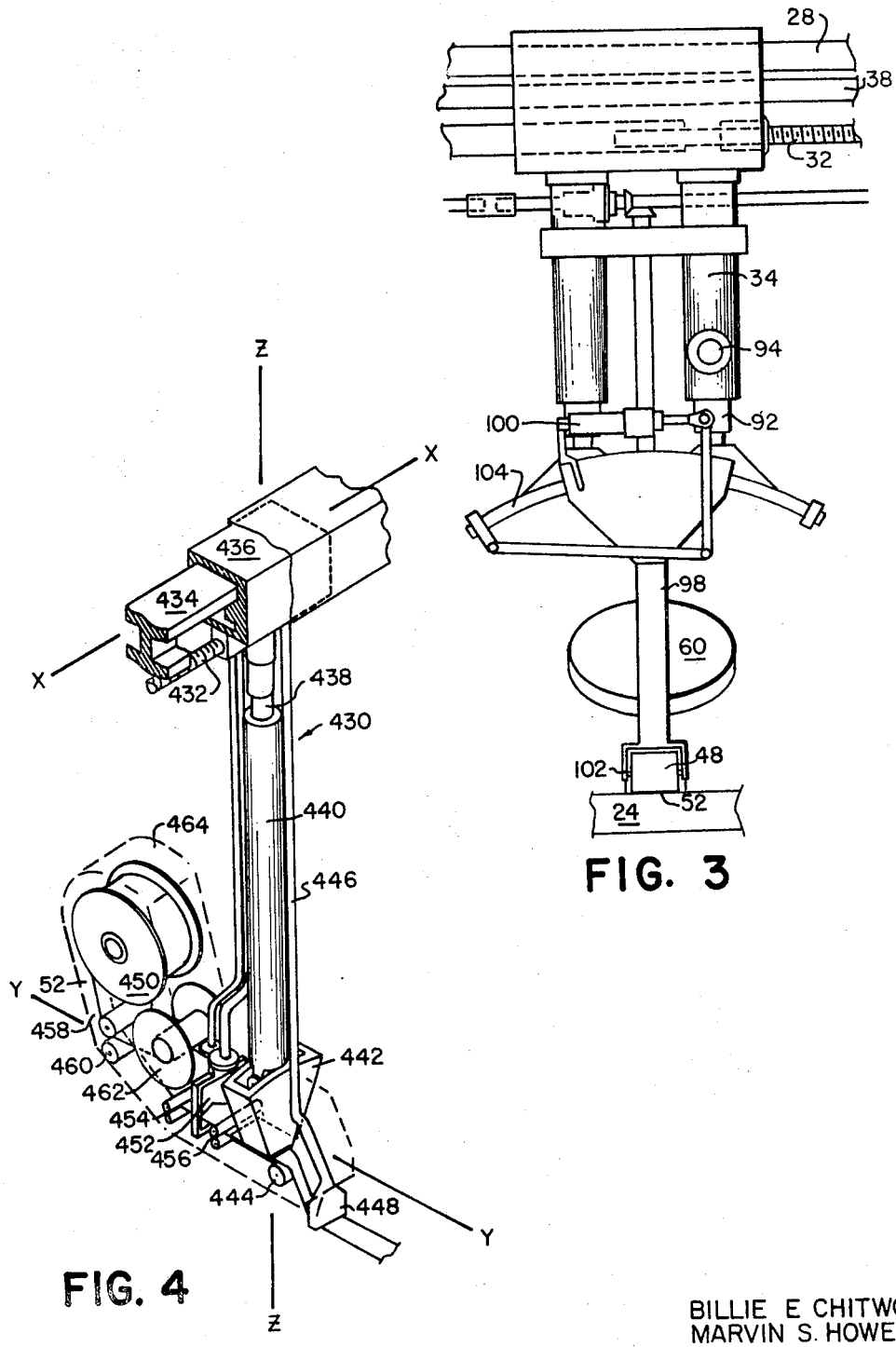

BILLIE E. CHITWOOD
MARVIN S. HOWETH
INVENTORS

United States Patent Office 3,574,040
Patented Apr. 6, 1971

3,574,040
APPARATUS FOR MAKING LAMINATED STRUCTURAL SHAPES BY THE CONTROLLED DETRUSIVE PLACEMENT AND POLYMERIZATION OF TECTONIC FILAMENTOUS TAPES
Billie E. Chitwood and Marvin S. Howeth, Fort Worth, Tex., assignors to General Dynamics Corporation
Filed June 29, 1967, Ser. No. 650,020
Int. Cl. B65h 25/26; B32b 31/04; B29c 17/04
U.S. Cl. 156—522       3 Claims

ABSTRACT OF THE DISCLOSURE

An apparatus characterized by its capability for precision, oriented, unidirectional placement and detrusion of tectonic filamentous tapes to form structural shapes. It is capable of operating in from a 3-axis to 5-axis coordinate trace and comprises, in combination, a function control system, a base member, a tape placement and detrusion pendant and a work supporting bed, at least one of the latter movable with respect to the other.

BACKGROUND OF THE INVENTION

Tectonic filaments and oriented, unidirectional, tectonic filamentous tapes (hereinafter defined) have only recently evolved as a new technology. Therefore, laminated composite structural shapes destined for use in the fabrication of advanced aircraft and aerospace vehicles constitutes an even later innovation. Structural shapes and aerospace components manufactured to date from tectonic filamentous tapes have largely been the result of research and development effort and always require slow, meticulous, manual pressure placement lamination and polymerization of tectonic tapes which must be carefully oriented, spaced, layered, trimmed and fixed in place by tedious manual skill in a dust and contaminate-free environment. Such manual fabrication is, of course, always subject to human factors such as error and desired accuracy and precision are thereby placed in constant jeopardy.

No other machine or apparatus presently known in the art has the capabilities of the present apparatus for fabricating laminated shapes of high structural integrity by precision controlled placement, detrusion and lamination of tectonic filamentous tapes to form composite, unidirectionally stressed, structural shapes capable of use as reliable primary structure in the manufacture of aerospace vehicles, missiles and aircraft and similar applications.

SUMMARY OF THE INVENTION

The present invention relates generally to apparatus for making composite structural shapes of tectonic filamentous material. More particularly the invention contemplates the use of unidirectional, high strength-to-weight ratio, high-temperature stable, filamentous or fibrous tapes of a given class for the precision manufacture of composite structural shapes in such manner that predictable, highly reliable and reproducible moduli of elasticity, flexure, directional tensile strength, low density and related mechanical properties are inherently provided in the end product.

Such unidirectional strength-imparting tapes, hereinafter referred to as tectonic filament tapes, are critical factors in the fabrication of high load carrying composite structural shapes and are highly advantageous in the construction of superior aerospace vehicles, such as in the construction of supersonic aircraft and in missiles, spacecraft and the like.

In the instant invention these filamentous tapes which are employed in a lay-up method of fabrication of high strength structural shapes are substantially limited to the class referenced herein as tectonic tapes which are reinforced with tectonic filaments or fibers and are defined as being any of a class of filamentous tapes comprised of unidirectional, tectonic filaments, or fibers, preimpregnated with a matrix of any organic, thermosetting resin; tectonic filaments and tectonic fibers being defined as any of a class of advanced filaments or fibers which may be employed in the construction of flexible, highly stressed, structural parts because of their inherent ultra-high tensile strengths, moduli of elasicity, low densities and related mechanical properties. Examples of such filament material include, but are not necessarily limited to, the materials listed in the following table, which also sets forth tabular values of three of their most important physical properties:

|  | Density, lbs./in.$^3$ | Modulus, $1 \times 10^6$ | Tensile, K s.i. |
|---|---|---|---|
| Boron (halide process) | .090 | 60 | 500 |
| Boron (hydride process) | .085 | 60 | 350 |
| Carbon | .045 | 22 | 150 |
| SiC | .116 | 65 | 450 |
| Be | .066 | 35 | 185 |
| S-glass | .090 | 12.6 | 650 |
| E-glass | .092 | 10.5 | 500 |

For purposes of establishing critical limits for tectonic filaments, fibers and tapes claimed for this invention and to thereby limit the definition of tectonic filaments, fibers and tapes employed in the composite structural shapes of the instant disclosure to a specific class, tectonic filaments and fibers are herein represented as possessing, as a minimum, the following characteristics and mechanical properties: (1) a tensile strength, in K s.i. of at least 100; (2) a density in lbs./in.$^3$, of at least .040; and (3) a modulus of elasticity of at least ten (10) million pounds per square inch.

Conventional structural shapes, such as are employed in present day aerospace vehicles, are usually fabricated from metal, such as from aluminum, steel, titanium and the like. These metals are substantially isotropic in character insofar as their capability for carrying structural loads is concerned. However, aircraft and aerospace vehicles do not impose isotropic stresses on their load carrying components when functioning in their normal mode of operation, but rather impose stress loads that are generally anisotropic in nature; usually being substantially unidirectional. For example, the three areas of a conventional aircraft shown in tubular form below relate the structure of each area and their respective primary stress loading modes to metal structures, and by comparison, to structural shapes fabricated from tectonic filamentous, unidirectional oriented, tape laminae to provide load carrying structure for the same areas:

| Area | Stress design mode | Metals | Composite filament orientation |
|---|---|---|---|
| Horizontal tail | Rigidity | Honeycomb and thickness | 0°±45° |
| Wing lift surface | Bending | Integral stiffeners | 0° |
| Fuselage | Shear | Shear plates | ±45° |

NOTE: Above orientation of tectonic fibrous tape is in degrees in respect to load vector.

Such structural areas of aircraft, when constructed of tectonic filamentous tapes, realize a weight reduction over metal construction of from 40% to 60%. This weight reduction is a direct result of oriented tectonic filaments in directional consonance with the primary stress load, thus imparting an anisotropic, substantially unidirectional load bearing path into the primary structure. Such anisotropic composite structure provides a very appreciable advantage over metallic structures of the conventional type in that the mass of the tectonic filamentous tape composite structure is positioned in the aircraft component in such manner as to satisfactorily carry the primary stress loads without bearing the weight penalty imposed upon metal and other isotropic structures. The load bearing structure is custom-made with unidirectional tectonic filamentous tape to fulfill the requirements for bearing the primary load condition. Such custom-making is accomplished by a predetermined orientation of the tectonic filaments; secondary stress loads being transferred by the simple expedient of orienting a lesser number of unidirectional filaments in the direction or directions of the secondary loads. Metals and other isotropic materials have the inherent capability to carry primary loads in all directions but are of necessity actually designed for bearing the primary load only in one general direction; the unstressed material merely constituting dead-weight. Dead-weight is a very deleterious factor which imposes a severe useful-load penalty on any airborne structure or space vehicle.

Inasmuch as each filament of the stressed composite structure of which it is an element must substantially bear its proportionate part of the total load imposed upon the composite, its inherent mechanical and physical characteristics as well as its physical relationship of other elements and particularly to other filaments become critical factors in the laminating process and in the function of the apparatus that must operate to perform the process. Therefore spatial placement of the tectonic filamentous tape and such physical characteristics of the tectonic filaments and their organic, thermosetting resin matrix—such as flexibility, brittleness, stiffness, orientation, filament stress, continuity of the filament and the matrix system—are examples of factors which impart a peculiar character to tectonic structural composite systems. Therefore any effective fabrication of these composite structures demands a much greater degree of precision control, versatility and reliability in the apparatus which is to perform the precision placement, detrusion and orientation of the tectonic tape than any heretofore available in the known art.

For example, the degree of pressure applied in the lay-up of tectonic filamentous tapes has a critical effect on the mechanical properties of the finished structural composite. Insufficient pressure will result in inadequate adhesion between the plies of the laminar structure, as well as loose plies and poor compaction. Excessive pressure results in filament fracture, adhesive starvation of the inner faces through loss of resin by out-flow and filament abrasion. Further the points of contact at which filaments cross are critical pressure points. Excessive pressures at these points have two deleterious effects. First, there is a fracturing of the filaments and second, a bending or buckling of the filaments. Loss of filament strength and other mechanical properties due to fiber fracture is obvious. Not so obvious is the result of filament bending. One of the prime mechanical advantages of oriented tectonic filaments laminar composites is the absence of the "weave" pattern of the conventional laminated structure, exemplified by a resin impregnated, glass cloth lamination. A unidirectional, straight, fiber permits higher compression, tensile and flexural values in the resistance of the composite structures to such imposed loads. Bending or buckling in the filaments due to laminating would substantially obviate advantages gained through use of oriented tectonic filaments in structural shapes.

In addition to the above pressure control requirements, polymerization or curing of the resinous lamination is also critical in the process of composite formation, although perhaps to a lesser degree than that required for laminating pressure applications. In this respect, application of heat to the tectonic filamentous tape, simultaneous with the application of pressure, not only assures that desired adhesion of the tape to the preceding layer will take place by imparting tackiness to its resinous matrix but will also partially polymerize the pliable laminate's resinous matrix by curing under the application of heat, thereby advancing the composite matrix to a semi-cured C stage during the lay-down process and then conduct a partial cure operation on the resultant composite structural shape for complete polymerization of the resin matrix.

Also deemed critical in the fabrication of these composite structural shapes by tectonic tape lay-up lamination is gapping between adjacent tapes, particularly the gapping effect near the center of a die or pattern having a convex contour. The tendency for gapping is substantially eliminated by the present device having an ability to generate a curved lay-up path by utilizing a photoelectric cell edge follower. However, an equivalent device known as an air-gauge edge follower is capable of following the edge of a previously laid tape within a tolerance of less than $$ {+.010 \atop -.000} \text{ inch} $$

The presently embodied photoelectric cell edge follower employs the photoelectric cells to actuate selsyn motors which then move the tape laying apparatus laterally to position the edge of the tape being laid to within the above mentioned tolerances of the edge of the previously laid tape.

A critical tangential relationship with the die or pattern is imparted to the tape laying foot in order to maintain the plane of contact of the foot tangent to the surface of the die mold, regardless of its curvature.

It may therefore be seen that the degree of control of pressure range and heat range as well as the precision required for dimensional tolerances in the lay-up and orientation of the object tape and the mechanical versatility required for such operation serve to impose a degree of criticality on the design of the present apparatus not heretofore solved in this art.

The only structures in the present state-of-the-art known to be fabricated from tectonic filaments are the so-called filament-wound structures. These are entirely limited to the employment of glass filaments or cloth wound into bodies of revolution, such, for example, as nose cones for high-mach supersonic aircraft and aerospace vehicles such as rockets, missiles and re-entry bodies, or for spheriod shapes generally employed as pressure vessels for advanced technology such as in the aerospace sciences. Inasmuch as filament winding must be confined to the rather narrow field of structural shapes known as bodies of revolution, this art cannot be usefully employed in the fabrication of structural shapes such as flat plates and other shapes having compound or complex curves in their body configurations. The latter type of body configuration represents more than 90% of the structural shapes in all instances where tectonic, filament oriented, structural composites are a desideratum to the vehicle designer.

It is therefore one object of the present invention to provide an apparatus for making composite, laminated structural shapes, having high strength-to-weight ratios, high modulus of elasticity, and which particularly have an exceptionally high degree of structural integrity in their capability for maintaining their rigidity and for resisting imposed high stress loads selectively, in tension, shear or flexure.

Another object of the invention is to provide apparatus for making composite structural shapes of the above class and character by the controlled placement and orientation of laminae of pliable tectonic tape in such manner that, when cured, either anistropic or isotropic physical properties have been selectively imparted thereto.

A further object of the invention is to provide semi-automated or fully automated apparatus for manufacturing composite structural shapes which has the capability for selectively laying tectonic tapes along any of the three major dimensional axes on a predetermined, preprogrammed pattern and for simultaneously imparting a critically constant and controlled amount of pressure and heat thereto, and finally for end-cutting such tape strips to the angle desired.

These and other objects and advantages of the invention will become more readily apparent to those skilled in the art upon consideration of the following description of the appended drawings wherein:

FIG. 3 is a rear elevational view of the pendant of FIG. 2;

FIG. 4 is a second embodiment of the tape laying and detrusion pendant;

Figure 1:
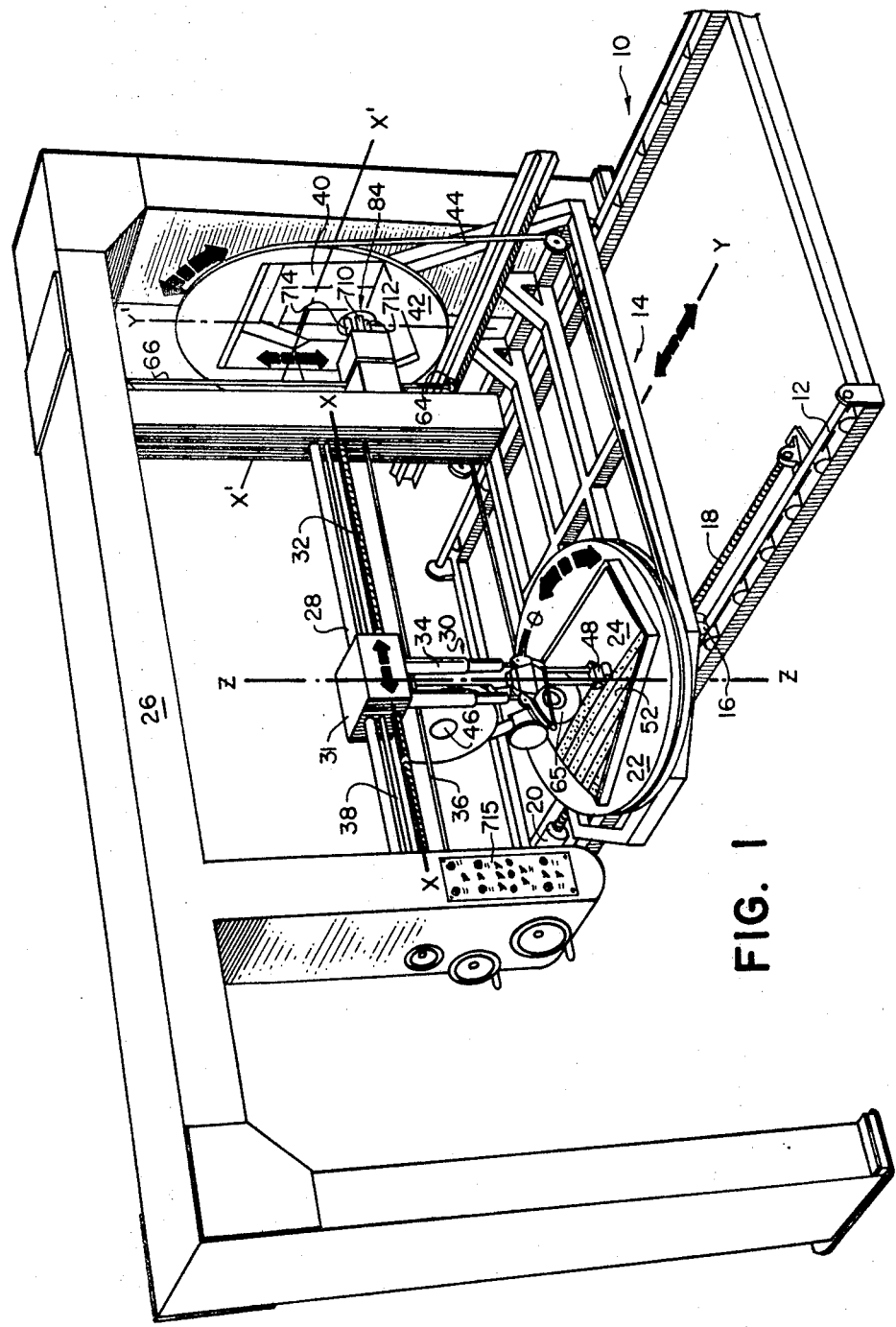
FIG. 1 is an isometric view of one embodiment of the apparatus of the present invention showing the essential elements of a tectonic tape laying machine as employed for the manufacture of composite structural shapes.

Referring now to FIG. 1 of the drawings, the present embodiment of the invention is shown as an apparatus comprising a base member or bed 10 having track members 12 extending longitudinally along each side thereof upon which a work table 14 is movably mounted by means of grooved wheels 16 for longitudinal movement along the Y-axis. Movement of work table 14 longitudinally along Y-axis is effected by operation of conventional worm screw drive shaft 18. Pneumatic motor 20 provides the power source for driving worm screw drive shaft 18, which passes through one or more conventional worm screw drive nuts (not shown) fixedly attached to the lower surface of bed frame 14. Pivotably mounted upon the upper face of bed platform 14 and rotatable in respect thereto, rotary turntable 22 is so constructed that patterns, dies and the like 24 may be bolted or otherwise rigidly affixed thereon in such manner that when turntable 22 is rotated about the Z-axis either clockwise or counterclockwise, the tool die or pattern 24 is also rotated in the same direction and to the same degree θ with respect to the X and Y axes. Trellis frame or gantry 26, which spans base 10, work bed 14, rotary turntable 22 and the general work area about die pattern 24, supports rail beam 28 upon which tram carriage 31 for tectonic tape laying detrusion pendant 30 is movably mounted for traversing the work area laterally along the X-axis. Worm screw drive 32, which laterally drives detrusion pendant 30 and various pneumatic cylinders 34, conduits 36 and electrical wires 38 are also suitably disposed and attached along the sides of rail beam 28; all of which are adapted to mechanically operate in a manner well known in the art. A vertically disposed master indexing template 40, or other known state-of-the-art media for pre-registered master work control is operable for pre-registering data and for effecting at least 3-axis control of the movement and operation of tape-laying pendant 30 and its related or associated working mechanisms, is illustrated, for example, as being fixedly mounted upon the inner face of vertically disposed, rotary turntable 42 and so arranged as to be in precise 3-axis, projected registry with the die pattern supporting horizontal rotary turntable 22 when rotated 90°. A continuous interconnecting belt drive 44 passing about grooved peripheries of both the horizontal turntable 22 and vertically mounted indexing turntable 42 respectively, serves to assure exact, synchronous rotation thereof both as to speed and direction.

From the above it may be readily seen that die pattern 24 when fixedly mounted upon horizontal turntable 22 may be moved in respect to tape laying detrusion pendant 30 longitudinally along the Y-axis, laterally along X-axis, rotated about Z-axis or may be simultaneously moved along both X and Y axis, or when desired it may be moved along the X and Y axes while rotating about the Z-axis. Thus tape placing detrusion pendant 30, hereinafter described in more detail, is given the operational capability of precise tape placement by unwinding tectonic tape from reel 46, applying a controlled, uniform, detruding and compacting pressure in the desired manner during placement and simultaneously imparting sufficient tackiness to achieve desired adhesion to the die face of the pattern or to the preceding lamina or layer, as the case may be. The heat source, in the preferred embodiment, is incorporated directly into the pendant's detrusion roller-foot 48, by thermostatically controlled electrical resistance heater elements 50, FIG. 5. However, other conventional means for imparting heat such as by use of electrical radiant heat lamps or by the circulation of a heated fluid through the pressure roller 48 is also contemplated. Such fluid system which may be heated and controlled in a separate unit is within the purview of the known art.

Figure 2:
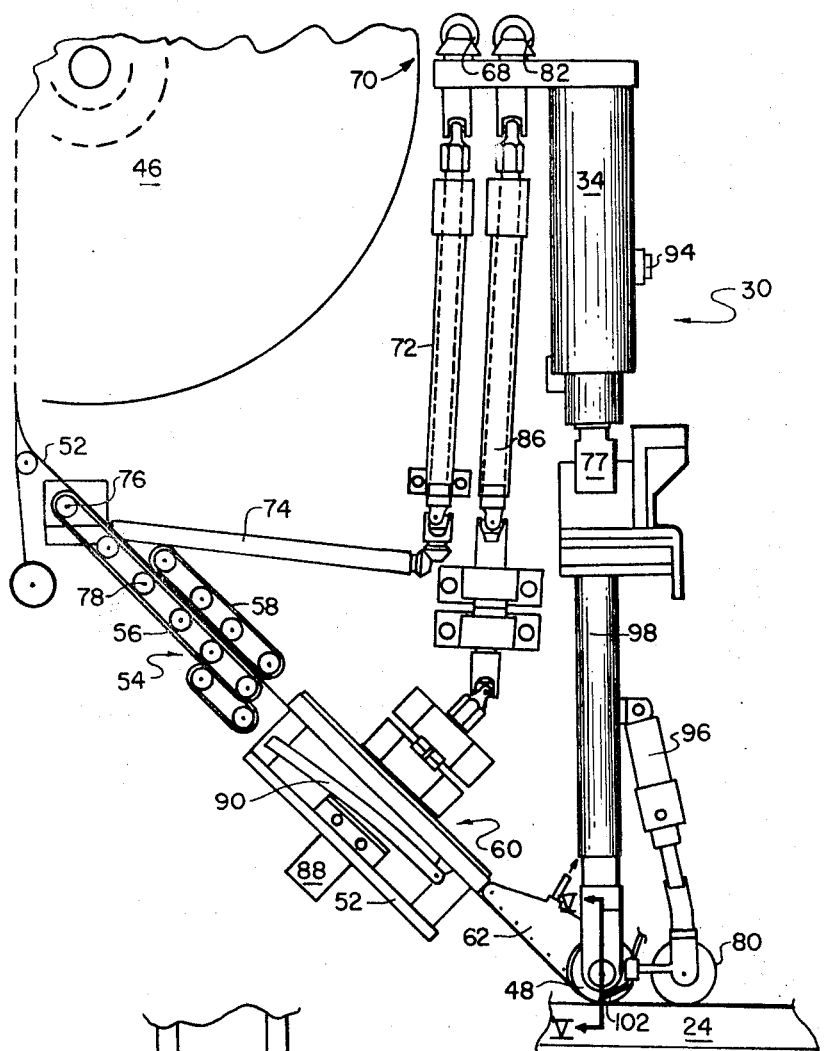
FIG. 2 is a side elevational view of the tape laying detrusion pendant which also shows its related tape dispensing reel and tape shearing device.

Referring now to FIG. 2, where a more detailed view of detrusion pendant 30 is shown in side elevation, tectonic tape 52 is unwound from spool 46 by tape tread conveyor system 54, in passing the tape between conveyor drive belts 56 and idler belt 58, then through tape shear assembly 60 and beneath pendant roller foot 48 by vacuum induced adherence to continuous tape applicator belt 62, whereby it is adhesively placed and detruded onto the upper face of die pattern 24. A predetermined rate of feed, which is consonant with the movement of work supporting table 14, FIG. 1, along the Y-axis is effected by mechanically linking a rack and pinion arrangement 64, see FIG. 1, between gantry frame 26 and bed 10, with interconnecting shaft and gear arrangement 66 to torque shaft 68, FIG. 2, and through mitre gears 70 to drive shafts 72 and 74 which in turn rotate tape conveyor drive sprocket 76. This then moves tape conveyor belts 56 and 58, respectively, over idler guide rollers 78 thereby feeding tape 52 therebetween, through rotary tape shear assembly 60 onto lower face of vacuum belt 62, thence underneath pressure loaded pendant roller foot 30 to thereby be detruded onto the upper face of die pattern 24, as also shown in FIG. 1. Since such mechanical drive shafts, universal joints, splined connections and gear arrangements, as are required to effect the above described operation are all conventional means in the mechanical arts, only a general showing and description are deemed necessary for an understanding by those skilled in the art. This is also applicable to the hereinafter described and shown electro-mechanisms employed for angular rotation and activation of tape shear assembly 60, constant pressure detrusion roller foot 48 and controlled pressure follower roller 80 respectively. The former is effected from operation of torque shaft 82, FIG. 2, which rotates upon an activation signal command from photoelectric scanning cells 84, FIG. 1, which operably scan master indexing template 40 or by any other suitable device which may be employed as a pre-registered master work controller. Such other devices as indexing cams, template tracers, punched and magnetic tape control are exemplary of other pre-registered master work controllers that are well known to the art. Photoelectric cells 84 convey coordinate movement signals, through conventional amplifiers, relays, solenoid valves, etc. (not shown) and controllably rotate torque shaft 82, FIG. 2, in a predetermined and pre-registered magnitude and direction. Upon translation through a mitre gear connection, torque shaft 82 rotates drive shaft 86. Such rotation is conveyed to tape shear assembly 60 to the extent that the latter is rotated to the pre-registered desired angle at which the tape is to be cut. Again a signal is received from the appropriate cognizing tracing finger at 84, FIG. 1, resulting in the activation of shear blade pneumatic actuator 88, which in turn trips shear blade 90, which shears tectonic tape 52 passing therebeneath. A constant predetermined detruding force is maintained by detrusion roller 48 through its rotatable axial attachment to the lower end of pneumatic piston rod 92, FIG. 3, the piston head of which is slidably positioned within cylinder 34. Pneumatic pressure against the upper and lower faces of the above-mentioned head is controlled by conventional pressure regulator 94 so that the predetermined and constant detrusion pressure is established and maintained as desired. Follower roller 80, FIG. 2, pivotally attached to piston strut 96, which in turn is pivotally affixed to main strut 98 of detrusion pendant 30, serves to follow detrusion roller 48. Roller 80 is operable for expelling any spurious air bubbles from beneath tape 52 and for the simultaneous dispersion of any fluid globules resultant from heating of the resinous matrix of the tape which may form or accumulate between the lower face of the tape and the previous laminate, or between the tape and the upper face of the die pattern 24, as the case may be, Pneumatic pressure within cylinder 96 is established and maintained by the operator from a remote control panel through conventional electro-mechanical devices (not shown).

Figure 5:
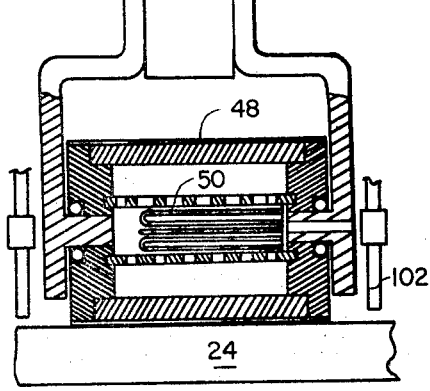
FIG. 5 is an elevational view in section taken at lines V—V of FIG. 2.

Referring now to FIG. 3, operational lateral level of detrusion roller 48 and follower roller 80, FIG. 2, are maintained parallel to work surface of die pattern 24 by pneumatic actuator 100; the direction of whose actuation is, in turn, controlled through a servo valve (not shown) responsive to signals from conventional proximity sensor devices 102, also shown in FIG. 5. Suitable mechanical bar linkages between the ram of actuator 100 and arcuate reaction swivel bar 104, translates linear movement of the ram to a corrective angular swivel of main strut 98 and thus of detrusion roller 48.

Another embodiment of the detrusion pendant 30 is shown by FIG. 4. It will be obvious to those skilled in the art that it is possible to modify the preferred embodiment 30 shown by FIG. 1 herein and described above, to provide a variety of equivalent detrusion pendants for relatively effective tectonic tape placement in the fabrication of filamentous composite structures. Such devices as a pendant employing a detrusion shoe element, a pressure foot, a flap wheel or other similar mechanical devices are exemplary thereof. Further, utilization of more sophisticated devices for this purpose which may employ ultrasonics or electron bombardment are feasible. Ultrasonic energy presents a method for applying laminating pressure where the short, very rapid motion of the ultrasonic transducer head serves two functions: first, detrusive compaction of the tectonic tape and secondly partial curing (Stage b) of the resin matrix, thereby tacking the tape to the die face of the pattern or to a preceding layer. The transducer head may take the configuration of a roller or pressure foot. A more practical method, however, for the application of detrusion forces is achieved by imparting a jet of controlled air pressure to the object tectonic tape as shown in FIG. 4. Such air pressure may also be temperature controlled in order to induce the necessary tackiness or impart thermosetting heat to the resinous matrix of the tape, as required.

Detrusion pendant 430 is laterally movable along the X-axis by operation of screw drive 432, which slidably moves it along rail support 434 in a manner similar to that of pendant 30 shown in FIG. 2, and hereinabove previously described. Referring once again to FIG. 4, there is rigidly affixed to and depending from carriage 436 a pneumatic piston 438 and related cylinder 440, the latter of which pivotally carries tape guide member 442 at the lower end thereof, for guiding tectonic tape 52 over idler roller 444 for maintaining the tape in parallel relationship with a tape receiving surface irrespective of the contour of the latter. Also depending from rail support 434 and operably connected to a reservoir or other source of pressurized air, pneumatic pressure conduit 446 carries an integral pressure detrusion nozzle head 448 at the lower end thereof. Nozzle head 448 is positioned immediately above tape 52 and in close proximity thereto for imparting a jet of pressurized air as a tape placing and detruding force thereagainst. Tape 52, which is carried on spool 450 is unreeled and fed through guillotine shears 452 and over idler roller 444 by drive rollers 454 and 456; such drive rollers being synchronously driven as a result of the longitudinal or Y-axis movement of work-table 14 (not shown in FIG. 4), and is mechanically linked to rack and pinion 64 and driven through a series of drive shafts, mitre gears, etc., in a manner similar to that previously shown and described in FIGS. 1, 2, and 3.

As tectonic tape 52 is unreeled from spool 450, a plastic separator strip 458 is peeled therefrom by being passed between separator rollers 460 while the tape 52 simultaneously passes beneath the lower of these two rollers. Separator strip 458 is then wound onto reel 462 which is, in turn, synchronized with the rotation of spool 450, i.e., reel 462 winds the strip onto its spool at substantially the same rate at which the tape 52, carrying the separator strip, is being unreeled from spool 450; a conventional slip clutch mechanism, embodied within the cylindrical portion of the spool, acts to compensate for any discrepant rotation therebetween. Upon passing through the first pair of driver rollers 454, tape 52 feeds through the rectangular frame and beneath the shearing knife of guillotine shear assembly 452, thence through a second set of feed drive rollers 456, over idler roller 444 and finally passes beneath detrusion nozzle 448, where it is subjected to the detrusion pressure of a single large jet of air, or alternately, of a multiple of small high pressure jets effected by passing the jet stream through an apertured baffle plate contained within nozzle 448 near the lower extremity thereof. As hereinabove stated this pressurized air may be preheated for the purpose of inducing tackiness in the resinous matrix of the tape or if desired to cure the resin at the time the tape is laid down. A suitable housing 464 is provided to cover the mechanism.

Although there are a number of pre-registered controller systems presently available in the art of automation for pre-registered data indexing and operational mechanical control of the present apparatus, the technique of scanning a line programmed-indexing template with photoelectric cells and converting the resultant photovoltaic effect to generate an electromotive force to selectively or sequentially operate solenoid valves, motors and the like and functionally control the operation of selected mechanical elements of the machine, is shown and described herein as a preferred form of this segment of the invention.

Other exemplary embodiments for achieving pre-registered automated mechanical control include, but are not necessarily limited to: (1) cam indexing for vectoring, starting and stopping mechanical elements at any preselected coordinate point, as well as speed control, tape feed control, shear operation, pressure variation and the like; (2) template tracers, and (3) the more sophisticated punched card, punched tape or data registered magnetic tape to pre-program a master controller of mechanical operations.

Figure 6:
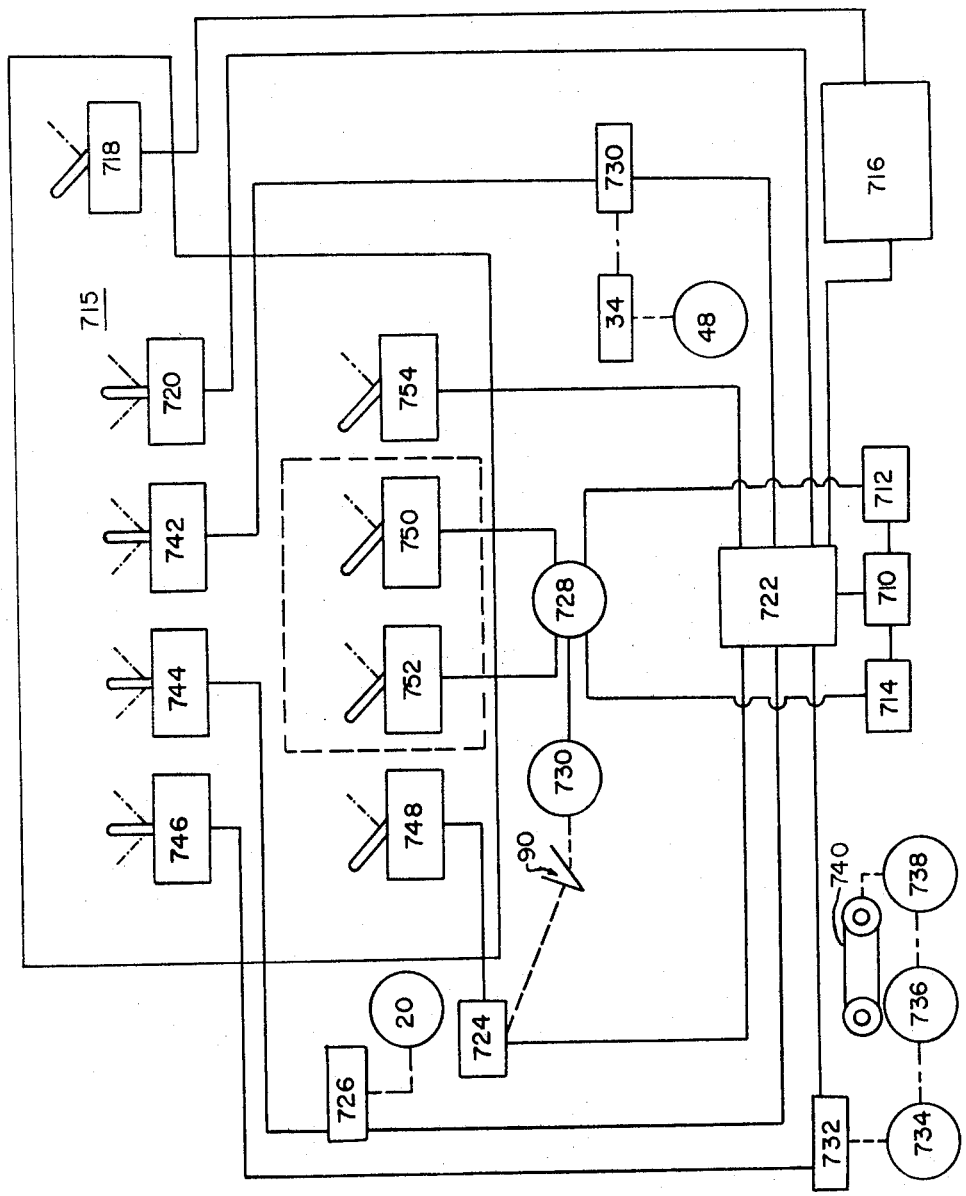
FIG. 6 is a block diagram of an electronic device employed in the exemplary pre-registered master work controller system.

As schematically shown in block diagram form in FIG. 6, the present pre-registered data master controller and indexing system utilizes a rotary indexing template 40, FIG. 1, upon which work vectoring or indexing control data has been pre-registered through the medium of light sensitive lines. As herein used, "vectoring" denotes the time that a given force is to act upon an object element and the direction in which said force is to be applied. It has a finite value and is represented as a line to which the beam of a photoelectric cell such as 710, 712 or 714 is responsive.

Electrical energy for the schematic system shown by FIG. 6 is obtained from a DC converter power source 716 by means of manual "Power-on-off" switch 718. The system is selectively placed in its "manual" or "automatic" mode by function switch 720. For the automatic mode, automatic function control box 722 is energized by manual closing and all manual selector switches are neutralized. Control box 722 embodies a power supply, relays, etc., as well as stepping switches which have been set for predetermined values and for sequential stepping; each step of which has been so programmed that accurately-timed sequential operation of the mechanical function to which it is related is thereby effected. As control box 722 is energized by switch 720, solenoid valve 724 is also energized, actuating pneumatic cylinder 34, FIG. 2, which lowers detrusion pendant 30 along with integrally related detrusion roller foot 48 and follower 80 onto the upper face of die pattern 24 at the preselected starting point and continues to increase its pressure until relief valve 94 is actuated to stabilize the pressure at a predetermined value.

This "pendant down" pressure activates a microswitch which interlocks the stepping switch element of automatic function controller 722 with pneumatic drive motor 20 via solenoid valve 726 for X-axis movement across indexing template 40, FIG. 1. This is effected when motor 20 drives work supporting bed 14 carrying both rotary worktable 22 and rotary indexing table 42 in a forward direction corresponding to Y-axis movement in the horizontal plane and X-axis in the vertical plane. As support bed 14 moves forwardly along the Y-axis, vertical rotary table 22 and consequently indexing template 40 mounted thereupon, are also carried forward along the X-axis of the latter.

This action is mechanically transmitted via rack and pinion 64 and causes the stepping switch element of function controller 722 to step to a first position, resulting in photoelectric cells 712 and 714 being turned "on" while photo cell 710 remains "off." Upon the first of the prescribed lines of master indexing template 40 moving into registry with photo cell 710 for example, shear position motor 728 is energized and caused to turn in a clockwise direction until both cells 712 and 714 and consequently cell 710 are also in registry with such first line. This action causes servo controlled follow-up motor 730 to rotate clockwise. This rotation turns shaft 82, FIG. 2, and consequently tape shear assembly 60, until shear knife 90 has moved to the desired, predetermined angular relationship with tape 52. When photo cell 714 registers "seeing" the first line, thereby indicating that photo cells 710, 712 and 714 are aligned at the proper angle in relation to the X-axis and that consequently knife 90 has rotated to the proper angular relationship with tape 52 in respect to the Y-axis of work carrying table 22, photo cell 710 is energized. It thereupon immediately "sees" the line and energizes solenoid valve 724, which in turn activates cylinder 74, FIG. 1. This activates shear knife 88, shearing tape 52 to the angle required for exact edge alignment consonant to that of pattern 24 and thus with the ends of preceding and subsequent strips of tape.

The actuation of shear knife 88 mechanically trips a micro-switch (not shown) and a second signal is sent to the stepping-servo embodied in control box 722, stepping the switch to a second position. This continues the movement of base 14 beneath detrusion pendant roller foot 48 in a forward direction along the X-axis at a relatively rapid traversing speed with photo cell 710 "on," but photo cells 712 and 714 "off." As the second line of the indexing pattern is brought into registry, the stepping switch of box 722 steps to a third position thereby slowing the movement of base 14 in its forward movement preparatory to a braking and stopping thereof. This is necessary to avoid "backlash" and resultant tape placement inaccuracies as well as to alleviate shock and strain on the interlock action of the "forward/rearward" relay and to avoid mechanical shock to the system as a whole. After slowdown and indexing, line number 3 is moved into registry with photo cell 710, control 722 is stepped to its position 4 and the resultant signal stops forward X-axis movement of photo cells 710, 712 and 714 by terminating rotation of Y-axis drive motor 20 and simultaneously braking to full stop all forward movement of worktable 14 along the Y-axis. This action activates solenoid 730, causing hydraulic cylinder 34 to raise detrusion roller foot 48 from the upper face of die pattern 24, and de-energizes photo cells 710, 712 and 714. Lifting of detrusion roller foot 48 trips an appropriately located micro-switch (not shown) to step switch 718 of control box 722 to its No. 5 position. This fifth position of the switch sequence energizes solenoid 726 resulting in rotation of drive motor 20 counterclockwise. Thereupon worktable 14 carrying table 22 and die pattern 24 begins to move along its Y-axis in an aft direction at a relatively rapid rate of travel.

Simultaneous with the above, the fifth position of the stepping switch turns all photo cells "off" and also energizes a silicon control rectifier (SRC) motor control 732. This turns X-axis motor 734 to drive screw 32 clockwise, moving detrusion pendant 30 toward the right. These actions continue until screw 32 has made a predetermined and preset number of revolutions and has moved pendant 30 to the right a precise distance corresponding to the exact width of tape 52, so that the succeeding strip of tape will precisely follow and coincide with the edge of the preceding strip, yet not overlap it. It is also within the purview of known art to employ additional photoelectric cells for the specific purpose of precisely following the edge of the previously detruded strip of tape. With the use of appropriate sensing devices to activate selsyn motors and such motors, being, in turn, arranged so that they would guide the detrusion pendant and tape laying roller foot laterally, the device would quite accurately position the inner edge of the tape being laid and detruded in exact, contiguous relationship with that of the outer edge of the previously laid strip.

Completion of the sequence of the fifth position of the stepping switch embodied in function control box 722, FIG. 6, serves to "turn on" the light of photo cell 710, but work bed 14 is permitted to continue its aft movement until a fifth indexing line is brought into registry with the photo cell. At this juncture the stepping switch of automatic function control box 722 steps to position 6, which slows aft travel of work bed 14 preparatory to full braking of its movement to a complete stop without imparting shock to relays and damage to operating mechanical elements. Indexing line No. 6 next comes into registry with photo cell 710 and this trips the stepping switch to its position No. 7.

The circuit activated by the stepping switch at position No. 7 operates to apply full brakes and abruptly stops aft travel of bed 14 and simultaneously energizes solenoid valve 730. Solenoid valve 730 thereupon actuates Z-axis cylinder 34 to again lower detrusion roller foot 48. This action mechanically trips an appropriately positioned pressure switch (not shown) and SCR motor control 732 starts Y-axis motor 20 rotating clockwise. Thereupon the screw 18 again drives bed 14 forwardly at a slow rate. With this movement forward, bed 14 carries pinion 64 along its rack. This action trips an appropriately positioned two-way micro switch which energizes a relay of function control box 722 to cause SCR motor control 732 to appropriately turn X-axis drive motor 734 along with tape feed control motor 736 and position followup motor 738, resulting in tape feed tread assembly 740 feeding tape 52, FIG. 2. through guillotine shear assembly 60 and beneath detrusion roller foot 48 constant feed of tape 52 from reel 46 is assured through the medium of incorporating an appropriately positioned Sprague-type slip-clutch into the tape feed assembly 54.

With movement of work bed 14 in its forward direction along the Y-axis, rotary table 42 and indexing template 40 are also carried forward along their X-axis until index line No. 4 again passes beneath photo cell 710. As this line comes into registry with the latter, the stepping switch of function control box 722 steps to its position No. 8, which circuit increases the speed of bed 14 to its "fast" rate and brings indexing line No. 5 again into registry with photo cell 710, at which point the stepping switch is again stepped to reach its ninth position. The ninth position closes circuits operable to "turn on" photo cells 712 and 714. Bed 14 continues its fast movement forward and photo cell 710 once more is moved into registry with indexing line No. 6, at which juncture the stepping switch is stepped to its No. 10 position to energize the circuit which again changes the rate of travel of bed 14 from "fast" to "slow." This line also serves to de-energize photo cell 710, while photo cells 712 and 714 remain "on." Photo cells 712 and 714 next "see" indexing line No. 7 which results in the angular positioning of tape shear assembly 60 and shearing with blade 90 in a predetermined and preset angular relation to the Y-axis, as heretofore described. The tripping of shear blade 90 mechanically actuates an appropriately positioned microswitch which action is resultant in the stepping switch being stepped off from its No. 10 position and again into its No. 1 position to repeat the sequence. This cycle is repeated until the desired laminae have been placed, whereupon rotary work table 22 and rotary indexing table 42 are rotated to the desired degree of angular orientation for the subsequent lamina and the above described sequence is repeated for each succeeding layer until the desired structural shape composite has been laminated.

When selective individual operation of one or more of the above described automatically stepped functions is needed or desired functional control switch 720 is manually set to the "step" mode. Then as "off biased" step switch 754 is repeatedly tripped from "off" to the "step" position the stepping switch embodied in automatic function control box 722 is sequentially shunted past the number of operating steps desired to be by-passed until the step for operation desired to be performed is reached. At this juncture "off-biased" step switch 754 is released and the manual control switch for the single operation desired is tripped. Alternately, by resetting functional control switch 720 to its "automatic" mode, at this point, the machine will perform the remaining operational sequences automatically as the automatic function control step switch traverses the remaining positions.

When the function control switch 720 is set to the "manual" mode, power is made available to each of the manual operation circuit switches controlling the function which is desired to be individually performed. Thus, circuits to the various switches on power panel 715, FIGS. 1 and 6, are made available to the operator for his manual selection, and are then operable to effect closing of the electrical circuit to the single functional component selected by him for operation. By means of switch 742 a direct circuit to solenoid 730 may be energized and pneumatic cylinder 34 thereby controlled to selectively raise or lower roller foot 48 along the Z-axis, FIGS. 1 and 6, and also to brake its travel speed, when necessary. Switch 744 may likewise be tripped to close and energize a single circuit to solenoid 726 to thereby controllably operate pneumatic motor 20 which, in turn, moves work table 14, FIG. 1, either backward or forward to thus pass the workpiece 24 beneath roller foot 48 of detrusion pendant 30 for placement of tape 52 thereon. Switch 746, FIG. 6, is similarly available for selective activation of SPC motor control 732, resultant in operation of pneumatic motor 734 for lateral movement of pendant 30, FIG. 1, to either the right or left along the X-axis. The X-axis pneumatic motor 734 is also operable for synchronized operation of tape feed track assembly 740, tape feed control motor 736 and position follow-up motor 738 as shown in FIG. 6.

Switch 748 is available to the operator for selective, individual actuation of shear blade 90, FIGS. 2 and 6, in that solenoid valve 724 is appropriately positioned to trip the blade when energized by a manual closing of the circuit from this switch. Angular rotation of shear assembly 60 and consequently shear blade 90, may also be manually effected; clockwise rotation thereof being effected when switch 750 is manually closed to energize and rotate control motor 728 in a clockwise direction resultant in shear position follow-up motor turning shear blade assembly 60, FIG. 2, and thus shear blade 90, in a clockwise direction and switch 752 being similarly available for rotating the shear blade counterclockwise as shown.

In summary, the apparatus for fabricating, by lamination, of composite structural shapes from tectonic filamentous tapes of the present invention, is characterized by its unique capability for effecting very accurate and extremely precise five-axis automatic, semi-automatic or manual control for the spatial placement and controlled detrusion of strips of tectonic resinous tapes in such manner that the physical attributes and desirable characteristics of the unidirectional tectonic filaments embodied therein may be fully exploited and made effective to the maximum degree possible in imparting a high degree of tensile strength, a high modulus of elasticity and low density to the resultant structural character of the composite.

We claim:
1. Apparatus for laminar formation of composite structural shapes by precise orientation, placement and detrusion compaction of tectonic filamentous tape, comprising, in combination:
 (a) a master functional program controller having:
  (1) media for pre-registering quantitative program control data,
  (2) read-out means for extracting the pre-registered data and converting such data to consonant quantitative electrical voltages, and
  (3) electro-mechanical means responsive to the quantitative electrical voltages for imparting dynamic, operational control to a mechanical tape depositing, detrusion apparatus and thus to effect precise orientation, placement, compaction pressure and segment length control of the object tape,
 (b) a table-like platform for mounting a tape receiving, configuration-shaping die pattern,
 (c) a tape dispensing, placement and detrusive force exerting tape placement and compaction pendant mechanism, with at least one of said work supporting, table-like platform and said tape placing, pendant mechanism, movable in respect to the other, said tape placing, detrusive pendant mechanism, comprising:
  (1) a tram carriage member for movably suspending said detrusion pendant mechanism,
  (2) a reel supporting member for rotably mounting tape containers upon said pendant mechanism,
  (3) a tape conveyor mechanism for controlled regulation of the rate of tape dispensation from the reel consonant with rate of placement,
  (4) a tape placement and detrusive compaction roller foot for advancing the tectonic tape along the tape receiving face of the work shaping body or die pattern and simultaneously imparting detrusive, compaction forces thereupon.
  (5) a rigid strut member for rotatably receiving said pressure foot at the terminal end thereof,
  (6) at least one piston strut member, operably engaging said rigid strut member for arcuate move- ment of the latter in respect to the axis of engagement, (7) at least one pneumatic cylinder for slidably receiving said piston strut and operable for imparting pneumatic pressure upon the piston head thereof, (8) a pressure regulator in operable communication with said pneumatic cylinder for maintaining a constant working pressure upon said piston strut member and consequently upon said pressure foot imparting the pressure to object tectonic tape being placed, (9) a pneumatically controlled linkage assembly operable for arcuate adjustment of said rigid strut member and consequently said roller foot carried by said member in relation to the work surface of the die pattern,

(10) an angularly adjustable tape shear assembly carried by said pneumatic pendant strut for receiving and selectively shearing object tectonic tape to the segment length and at the precise angle desired,

(11) a vacuum-force belt tread for gripping and conveying object tape to the lower tangential surface of said roller foot,

(12) an electrical resistance heater element carried internally by said roller foot for inducing heat thereinto and consequently into the object tape for effecting adhesive tackiness in the latter, and

(13) a pressure exerting follower pivotally attached to the rearward side of said rigid strut for imparting detrusive pressure to object tape to forcibly exude superfluous resin and spurious air or volatile substances from the innerface of tape being deposited, and (d) a gantry-like trellis member, traversing the work area, for movably supporting said detrusion pendant, and (e) a fixed, bed-like tracking base for carrying said work die-pattern supporting platform.

2. Apparatus for the laminate formation of anisotropic, composite structural shapes by the precise orientation, placement and detrusive compaction of tectonic, filamentary, composite tape, comprising, in combination:

(a) a master functional program controller having:
(1) means for pre-registering quantitative program control data;
(2) read-out means for extracting such pre-registered data and converting said data to consonant quantitative electrical voltages; and
(3) means responsive to the quantitative electrical voltages for imparting dynamic, operational control to a tectonic filamentary composite tape depositing and detrusion apparatus and to thus effect precise orientation, placement, compaction pressure and segment length control of object tape;

(b) a homalosternal base means for receiving said tectonic tape upon the upper face thereof;

(c) a tape dispensing, placement, detrusion and compacting mechanism for orienting, placing and compacting said tape, with at least one of said homalosternal base means and said tape placement and compacting mechanism being movable with respect to the other; said tape placing, detrusive and compaction mechanism comprising, in combination:
(1) a tram-like carriage member for movably suspending said tape dispensing and compacting mechanism;
(2) a reel supporting member for rotatably mounting at least one tape container reel upon said tape dispensing and compaction mechanism;
(3) a tape restraining means for regulation and control of rate of tape dispensation from said reel container consonant with rate of placement;
(4) a tape placement and detrusive compaction foot for laying and detrusively compacting an object tape along and upon the tape receiving face of said homalosternal base means;
(5) a vertically disposed rigid mounting means for movably supporting said tape placement and detrusive compaction foot at the lower end thereof;
(6) at least one pneumatic actuating means in operable engagement with said rigid mounting means for vertical axial movement of the latter with respect to said tape receiving surface of said homalosternal base means;
(7) pressure regulating means in operable communication with said pneumatic actuating means for maintaining a constant working pressure upon said rigid mounting means and consequently upon said tape placing, detrusive pressure foot;
(8) an angularly adjustable tape severing assembly carried by said rigid mounting means for receiving and selectively severing the object tectonic tape to the exact segment length and at the precise angle desired;
(9) means for gripping and advancing the object tape to the lower surface of said tape placement, detrusive pressure foot; and
(10) means providing a radiant energy source operably mounted to trail said tape laying, detrusive pressure foot for imparting radiant energy upon the object tape resultant in selectively curing the resinous carrier-matrix or alternately for effecting an adhesive tackiness thereto;

(d) a gantry-like trellis member, traversing the work area, for movably supporting said tape dispensing and detrusive compaction mechanism; and (e) a fixed base platform for supporting said work receiving homalosternal base means.

3. Apparatus for the laminate formation of tectonic, filamentary, composite structural shapes in a manner imparting anisotropic strength characteristics thereto by precise orientation, placement and destrusive compaction of tectonic, filamentary composite tapes, comprising, in combination:

(a) a master functional program registrar and function controller having:
(1) means for pre-registration of quantitative program control data;
(2) read-out means for extraction of the pre-registered data from said pre-registration means and converting such data to consonant, quantitatively functional electrical impulses; and
(3) electro-mechanical means responsive to the functionally quantitative electrical impulses from said read-out means for imparting precise, dynamic, operational control to a mechanical tape depositing, detrusive compacting apparatus to effect the precise orientation, placement, detrusive pressure compaction and segment length as well as angle of segment sever for an object tectonic filamentary tape;

(b) a table-like platform for directly receiving the tape or selectively for supporting a tape receiving, configuration-shaping die or pattern thereupon;

(c) a tape-dispensing, detrusive-pressure exerting tape-placement and compaction mechanism, at least one of the said table-like, work supporting platform and the said tape-dispensing, detrusive-pressure exerting, placement and compaction mechanism being movable with respect to the other, said tape dispensing, placement and compaction mechanism comprising, in combination:
(1) a tram-like carriage member for movably supporting said tape dispensing, detrusive-placement and compaction mechanism;

(2) a supporting member for rotatably mounting tape container reels upon said tape dispensing, detrusive placement and compaction mechanism;

(3) means effecting constant tension control upon the object tape being un-reeled to regulate the rate of tape dispension from the reel consonant with the rate of placement by said tape dispensing, detrusive placement and compaction mechanism;

(4) a tape placement and detrusive pressure foot element for precisely advancing the tectonic tape along the tape receiving face of the work configuration-shaping pattern or die body while simultaneously imparting a detrusive, compacting force thereupon;

(5) an axially rigid, angularly rotatable support member for receiving and supporting said pressure foot element at the lower end thereof;

(6) means for angularly indexing said tape dispensing, pressure foot element and the tape-receiving, configuration-shaping die or pattern member, at least one in respect to the other, for effecting angular control and change in direction at which the object tectonic tape is to be laid with respect to that strip or those strips which have been previously laid;

(7) actuating means operably engaging said axially rigid pressure foot supporting member for vertically raising and lowering said tape placement and detrusive compacting mechanism in respect to said work supporting, table-like platform;

(8) biasing energy means for imparting detrusive and compaction pressure to the object tectonic tape through the mechanical medium of said pressure foot element;

(9) pressure regulating means responsive to and in operable communication with said pressure foot element for pre-setting and maintaining a constant, pre-determined working pressure upon the object tectonic tape being placed through the mechanical medium of the pressure foot element;

(10) radially indexed tape severing means carried by said axially rigid support member for receiving and selectively severing the object tectonic tape to the exact segment length and at the precise angle desired;

(11) means for separating and stripping the object tectonic tape per se from its protective packaging film or web carrier; and

(12) means for automatically retrieving or rewinding said web carrier;

(d) a gantry-like trellis member, traversing the work area, for movably supporting said tape dispensing, detrusive pressure exerting and compacting mechanism; and (e) a fixed, bed-like base for carrying said work receiving and die or pattern supporting platform.

References Cited

UNITED STATES PATENTS

| | | | |
|---|---|---|---|
| 2,712,659 | 7/1955 | Paulsen | 156—213X |
| 3,206,911 | 9/1965 | Carle et al. | 156—522X |
| 3,272,672 | 9/1966 | Lampman et al. | 156—285X |
| 3,350,255 | 10/1967 | Twigg | 156—522X |
| 3,404,057 | 10/1968 | Heiart | 156—584X |
| 3,406,084 | 10/1968 | Varga | 156—522 |

BENJAMIN A. BORCHELT, Primary Examiner

J. M. HANLEY, Assistant Examiner

U.S. Cl. X.R.

156—212, 213, 285, 350, 468, 486, 547; 226—21